(12) United States Patent
Manda et al.

(10) Patent No.: US 7,284,978 B2
(45) Date of Patent: Oct. 23, 2007

(54) BRAKE FOR MOLDING MACHINE VALVE

(75) Inventors: Jan Marius Manda, Toronto (CA); Sean Ian Weir, Toronto (CA)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 304 days.

(21) Appl. No.: 11/172,588

(22) Filed: Jun. 30, 2005

(65) Prior Publication Data

US 2007/0003660 A1 Jan. 4, 2007

(51) Int. Cl.
*B29C 45/00* (2006.01)

(52) U.S. Cl. .................... 425/559; 251/64; 251/65; 251/297

(58) Field of Classification Search ................ 425/559; 251/297, 64, 65
See application file for complete search history.

(56) References Cited

U.S. PATENT DOCUMENTS

| | | | |
|---|---|---|---|
| 3,344,477 A | 10/1967 | Stokis | |
| 3,590,439 A | 7/1971 | Swanson | |
| 3,726,309 A | 4/1973 | Neubert | |
| 4,105,147 A | 8/1978 | Stubbe | |
| 4,643,665 A | 2/1987 | Zeiger | |
| 4,988,281 A | 1/1991 | Heathe et al. | |
| 5,112,213 A | 5/1992 | Oas | |
| 5,167,971 A * | 12/1992 | Gill et al. | 425/559 |
| 5,756,037 A | 5/1998 | Kitamura | |
| 6,007,322 A | 12/1999 | Suumen et al. | |
| 6,089,260 A | 7/2000 | Jaworski et al. | |
| 6,113,380 A | 9/2000 | Hara | |
| 6,270,703 B1 * | 8/2001 | Wildman et al. | 425/559 |

OTHER PUBLICATIONS

International Search Report for PCT/CA2006/000806, dated Jul. 18, 2006, 3 pages, related to the above-identified US patent application.

* cited by examiner

*Primary Examiner*—Tim Heitbrink

(57) ABSTRACT

Disclosed is a device configured for a valve. The valve has a valve structure that is configured to include an outlet body configured to define an outlet. The outlet body is also configured to attach to a melt processing screw of a molding machine. The valve structure is also configured to include an outlet cover configured to selectively close and open the outlet. The device includes a brake configured to decelerate the outlet cover responsive to deceleration of the outlet body, and the decelerating outlet cover maintains the outlet substantially closed.

66 Claims, 8 Drawing Sheets

BRAKE FOR MOLDING MACHINE VALVE

FIELD OF THE PRESENT INVENTION

The present invention generally relates to molding machines, and more specifically, the present invention relates to a molding machine non-return valve configured to have a brake mechanism.

BACKGROUND

A non-return valve (hereinafter referred to as the "valve") is installed on a tip of a melt processing screw (hereinafter referred to as the "screw"). The screw is mounted in a molding machine barrel (hereinafter referred to as the "barrel"). The screw rotates and forces melt forwardly which forces the valve to open and receive forwardly-advancing melt. Once enough melt is accumulated, the screw is then translated forwardly to force the valve to close. Then the screw is accelerated forwardly which causes the accumulated melt to surge out from the barrel and into a mold cavity. While the screw moves forwardly, the valve should, ideally, remain in a closed position which prevents a back flow of melt back towards the screw. Hence, the term "non-return" means that the valve prevents the melt from flowing back towards the screw as the melt is moved or injected into the mold cavity. Known valves attempt to prevent backflow but do so with less than ideal results.

Known valves are described in U.S. Pat. No. 6,007,322 (published in 1999), U.S. Pat. Nos. 5,756,037, 5,112,213, 4,988,281, 4,643,665, 4,105,147, 3,726,309, 3,590,439 and 3,344,477 (issued in 1967). Known valves, for at least 30 years, have suffered and continue to suffer from a high shot-to-shot variability (hereinafter referred to as the "shot variability"). In other words, each shot injected into a mold cavity is different from each other in volume and/or weight. It is desired to have a low shot variability, in that each injected shot is substantially repeatable in size by volume and/or by weight. Another indicator that is used to indicate valve performance is shot "repeatability". Known valves suffer from low shot repeatability. If shot size varies, the molded articles are not filled with an optimum amount of weight and/or volume of melt. Also, it is believed that if shot sizes vary, then the injection pressure "profiles" (that is, the pressure profile is a change in the injection pressure during injection of the melt over an injection cycle time) will vary which then will have a negative impact on article quality.

Several known theories for resolving the problem of shot variability are currently promoted. One theory suggests that to resolve the problem of low shot repeatability, molding machines should include the use of a closed-loop injection unit control, either with servo-electric valves on a hydraulic press or AC servomotors on an all-electric press. Yet another theory suggests that to resolve the problem, molding machines should include screws designed to meet the requirements of the melt and of the motor output that drives the screw. These theories attempt to resolve the high shot variability problem; however, over a span of over 30 years, the problem appears to persist and continue without a satisfactory outcome on the horizon.

SUMMARY

According to the inventor, it is believed that the reason why low shot repeatability associated with known non-return valves occurs is that these non-return valves do not stay sufficiently or substantially shut while a molding machine injects molding material into a mold cavity. The present invention relates to a molding machine non-return valve configured to have a brake mechanism. The technical effect or advantage of the brake is that the brake permits an amount of accumulated shot size injected into a mold cavity to be more repeatable, and thus the valve has a higher repeatability. Also, another technical effect is that the brake permits the valve to apply more consistent injection pressure that, in turn, permits the molding of parts having improved and consistent attributes.

In an aspect of the present invention, there is provided a device configured for a valve having a valve structure, the valve structure configured to include an outlet body configured to define an outlet, the outlet body also configured to attach to a melt processing screw of a molding machine, the valve structure also configured to include an outlet cover configured to selectively close and open the outlet, the device including a brake configured to decelerate the outlet cover responsive to deceleration of the outlet body, the decelerating outlet cover maintaining the outlet substantially closed.

In another aspect of the present invention, there is provided a valve, including a valve structure configured to include an outlet body configured to define an outlet, and to attach to a melt processing screw of a molding machine, and an outlet cover configured to selectively close and open the outlet, and a brake configured to decelerate the outlet cover responsive to deceleration of the outlet body, the decelerating outlet cover maintaining the outlet substantially closed.

In yet another aspect of the present invention, there is provided a molding machine, including a melt processing screw, and a valve, including a valve structure configured to include an outlet body configured to define an outlet, and to attach to the melt processing screw, and an outlet cover configured to selectively close and open the outlet, and a brake configured to decelerate the outlet cover responsive to deceleration of the outlet body, the decelerating outlet cover maintaining the outlet substantially closed.

BRIEF DESCRIPTION OF THE FIGURES

Exemplary embodiments of the present invention will be described with reference to the following Figures and the detailed description, in which.

DETAILED DESCRIPTION OF THE EXEMPLARY EMBODIMENTS

Figure 1A:
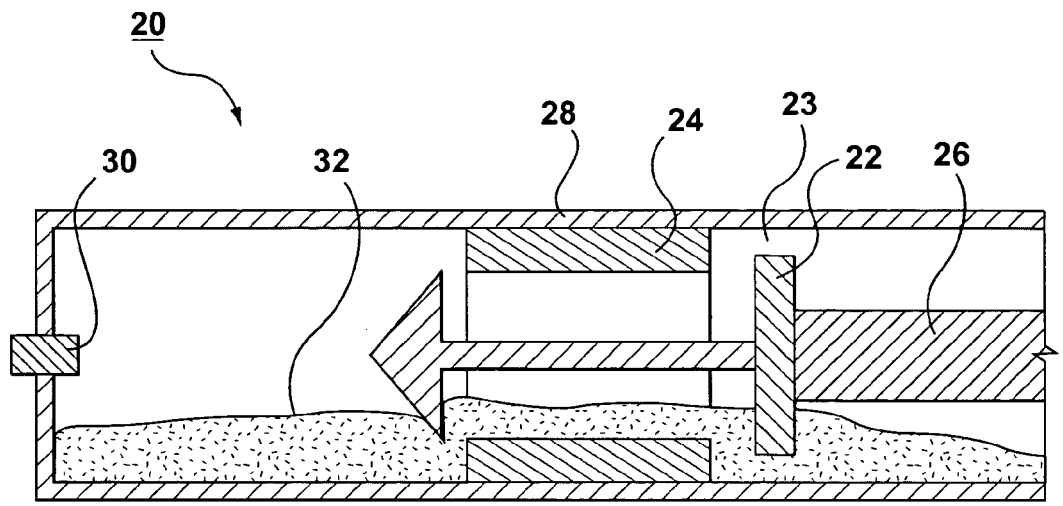
FIGS. 1A, 1B, 1C, 1D, 1E and 1F are longitudinal cross-sectional views of a known non-return valve for various phases of a molding machine cycle.

The inventors believe that the public does not understand the problem that leads to shot repeatability problems associated with known valves. FIGS. 1A, 1B, 1C, 1D, 1E and 1F will be used to identify and describe the problem as understood by the inventors; and that by understanding the problem, it is believed that a better understanding of the exemplary embodiments, which are directed to resolving the problem, is realized.

FIGS. 1A, 1B, 1C, 1D, 1E and 1F show longitudinal cross-sectional views of a known non-return valve 20 at various phases of a molding machine cycle. A typical molding machine cycle includes the following phases: a melt build-up phase, a melt pressure build-up phase, an injection phase, a transition phase, a cavity fill-out phase and a screw retraction phase. Generally, the valve 20 includes an outlet body 22 attached to a screw 26 that is fitted into a barrel 28 of a molding machine (not depicted). The screw 26 includes at least one screw flight (not depicted) so that when the screw 26 is rotated, the screw flight moves or conveys the melt towards the valve 20. All screws depicted in the remaining Figures include a screw flight configured to convey the melt (even though the screw flight is not depicted). The valve 20 also includes an outlet cover 24 that reciprocates relative to the outlet body 22. Defined between the outlet body 22 and the barrel 28 is an outlet 23. Melt 32 is processed by the screw 26. The barrel 28 defines a passageway 34 (see FIG. 1D) therein, and the passageway 34 is plugged or blocked by a plug 30 or alternatively plugged by a valve (not depicted) in place of the plug 30. For the sake of simplifying the description, the "processing screw 26" will hereinafter be referred to as the "screw 26".

FIG. 1A shows the condition of the valve 20 during a beginning of the melt build-up phase. The screw 26 begins to rotate and the rotating action pushes the melt 32 past the outlet 23 and into the frontal portion of the barrel 28. While the screw 26 rotates so as to prepare the melt 32, and convey it through and forwardly relative to the valve 20, the melt that accumulates ahead of the valve 20 will push (translate) the screw 26 backwardly. A shot of melt beings to accumulate between the outlet 23 and the plug 30. As the shot of melt 32 accumulates, the melt pressure remains substantially zero.

Figure 1B:
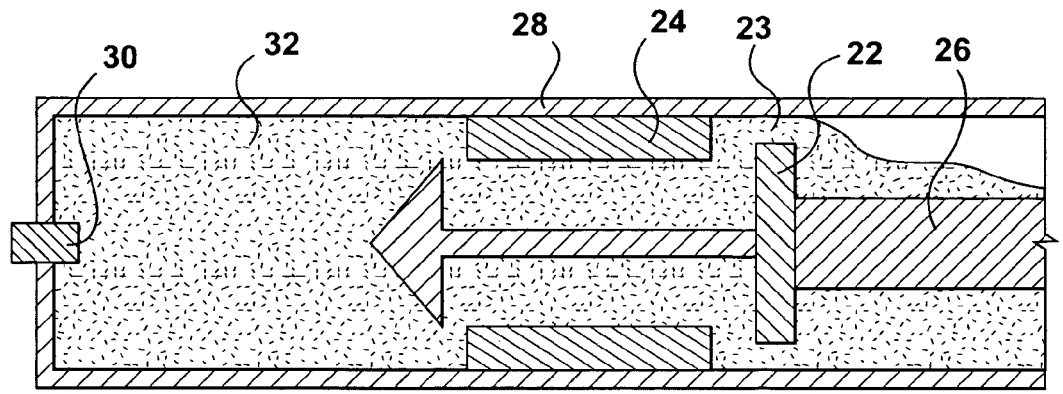

FIG. 1B shows the condition of the valve 20 during a tail-end of the melt build-up phase. The accumulated shot of melt is located between the outlet 23 and the plug 30.

Figure 1C:
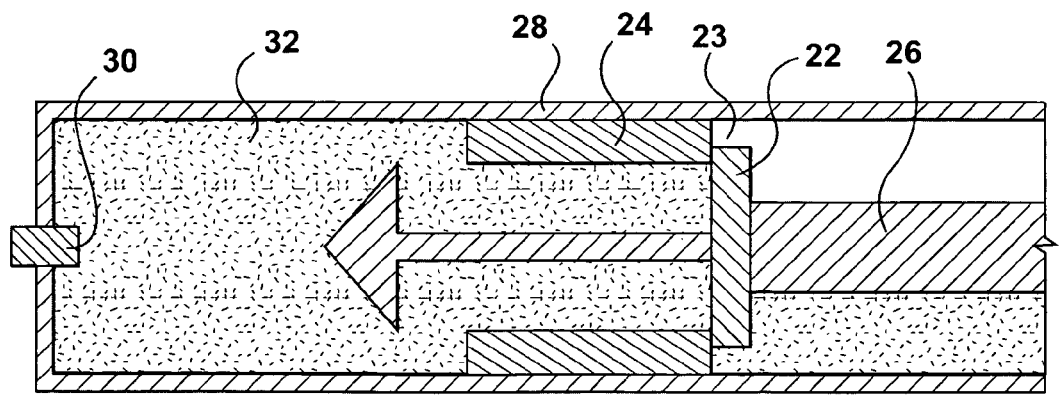

FIG. 1C shows the condition of the valve 20 during the melt pressure build-up phase. The shot has accumulated into a desired shot size, and the screw 26 is stopped from rotating. The screw 26 is accelerated (by a mechanism not depicted) towards the plug 30 from zero speed towards a predetermined speed. As the screw 26 accelerates, the outlet body 22 moves and contacts the outlet cover 24 so that the outlet 23 will become covered and sealed. Thereafter, as the outlet body 22 is pushed or accelerated by the screw 26 so will the outlet cover 24 be accelerated, and the melt pressure of the accumulated shot increases.

Figure 1D:
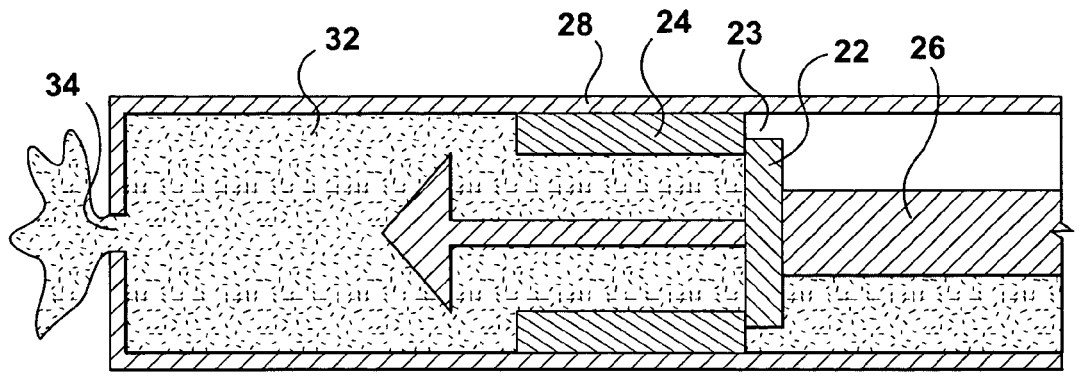

FIG. 1D shows the condition of the valve 20 during the injection phase. In the injection phase, the screw 26 is made to accelerate towards the plug 30. The plug 30 becomes released or blown out from the barrel passageway 34, and the accumulated shot begins entering a cavity of cooperating mold halves (not depicted). In response to the plug 30 releasing, the melt pressure decreases. However, in response to the melt pressure decreasing, the mechanism (that controls the translation of the screw 26) responds by dynamically adjusting the translation speed of the screw 26. The dynamic adjustment is accomplished by a feedback control system that causes the screw speed to oscillate, decay and then settle down to a steady-state speed (which usually is the "required speed"). During the time that the screw speed oscillates, the screw speed alternately decelerates and accelerates before reaching a steady-state speed. As the screw 26 accelerates in translation, and since the outlet cover 24 has a certain amount of inertia, the outlet cover 24 contacts and moves along with the outlet body 22 so that the seal between the outlet cover 24 and the outlet body 22 is maintained and the outlet 23 remains covered. However, as the screw 26 decelerates in translation, and since the outlet cover 24 has a certain amount of inertia and only abuts the outlet body 22, the outlet cover 24 continues to move ahead of the outlet body 22. In effect, the outlet cover 24 is catapulted forwardly ahead of the outlet body 22 thereby opening outlet 23 and allowing backflow of the melt, which in turn alters the shot size being injected into the mold cavity after "22". Eventually, the screw 26 reaches the required "steady state" speed and due to frictional forces, the outlet body 24 slows down enough to eventually contact the outlet body 22 and thereby stop any further backflow of the melt.

Figure 1E:
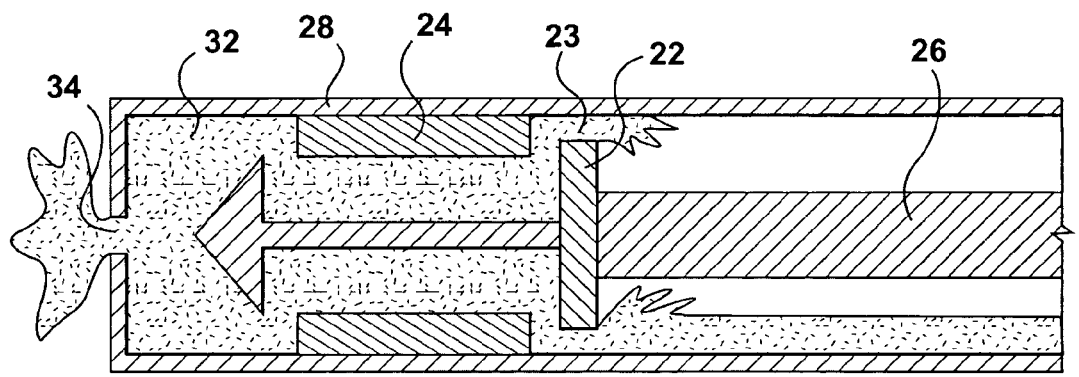

FIG. 1E shows the condition of the valve 20 during the transition phase. In the transition phase, the screw 26 decelerates in translation from the required "steady state" speed down to a substantially lower screw speed. The screw 26 continues to maintain pressure on the melt 32 as the melt, located in the mold cavity, solidifies. A significantly lower screw "translation" speed is required in this phase and so the screw speed control mechanism reduces the screw speed translation so that the screw 26 experiences significant deceleration in translation. Since the outlet cover 24 abuts and does not attach to the outlet body 22 that is connected to the screw 26, the outlet cover 24 continues moving ahead of the outlet body 22 because of the inertia of the outlet cover 24. As a result, the melt 32 leaks out back towards the screw flights of the screw 26. The article being molded does not completely form since the melt pressure is not adequately maintained as a result of the back flow or leak of melt 32 back into the barrel 28. Eventually the outlet cover 24 may slow down enough so that the outlet cover 24 may reseal itself against the outlet body 22 that would then stop the backflow of melt 32. However, this resealing "event" may or may not occur in time before the end of the injection stroke. In summary, the decelerating screw 26 and outlet body 22 acts as a catapult that catapults the outlet cover 24 towards the plug 30 since the outlet cover 24 abuts (but is not attached to) the outlet body 22. Backflow occurs once the outlet cover 24 and the outlet body 22 separate from each other during deceleration of the outlet body 22 to a degree than the melt 32 will continue to expel out into the mold cavity but will also expel back behind the outlet body 22 and back towars the screw flights of the screw 26. As a result of this, the shot size is not maintained and the article being molded will become defective in that the mold cavity fails to receive the correct amount of melt 32.

During the cavity fill-out phase, the screw 26 continues to maintain pressure on the melt 32 as the melt located in the cavity solidifies. A speed control mechanism maintains the screw speed at a constant rate so that the screw 26 does not accelerate or decelerate. The outlet cover 24 decelerates enough so that it may then contact and reseal against the valve body 22 and thereby the backflow leakage is stopped.

Figure 1F:
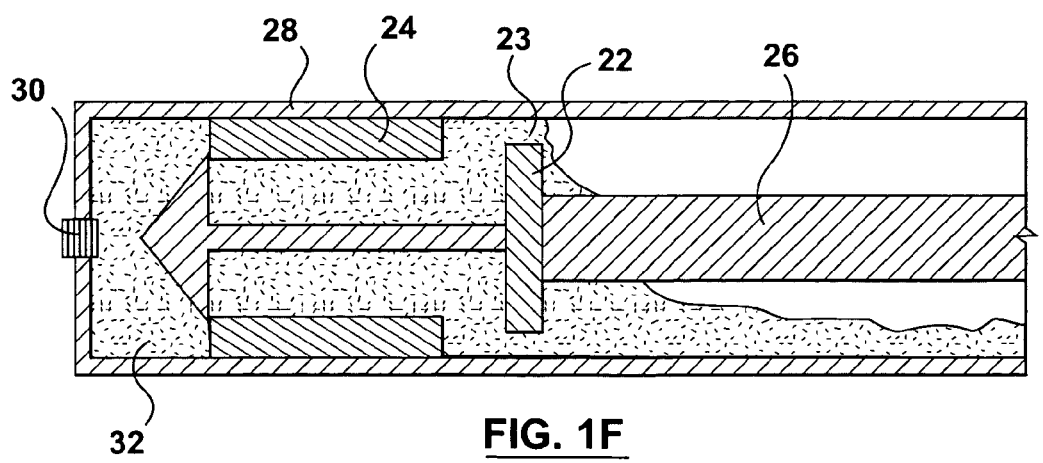

FIG. 1F shows the condition of the valve 20 during a part of the next melt build-up phase. Injection of melt 32 stops because the screw 26 is stopped from moving forwardly towards the passageway 34. It is desired to stop the screw 26 before it strikes the valve body 22 against the end of the barrel. A new plug is formed in the passageway 34. Then the screw 26 is rotated to prepare the next shot, and the accumulation of that next shot pushes the screw 26 backwards. As the screw 26 is pushed back, the valve body 22 becomes pushed back (retracted) away from the passageway 34. Retraction of the valve body 22 opens the valve. As the screw 26 is retracted, the screw 26 is rotated which then feeds more melt into the opened valve body 22.

Figure 2A:
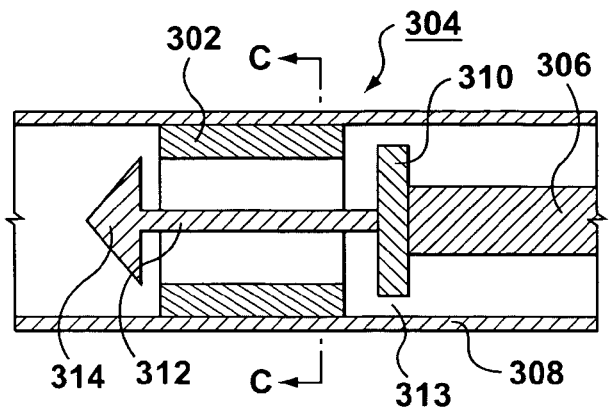
FIGS. 2A, 2B, 2C and 2D show a non-return valve according to a first embodiment (which is the preferred embodiment)

FIG. 2A is a cross sectional view of a non-return valve 304 according to the first embodiment (which is the preferred embodiment). The valve 304 includes an outlet body 310 attached to a distal end of a screw 306 that is disposed within a barrel 308 of a molding machine (not depicted). The valve 304 also includes an outlet cover 302 that reciprocates relative to the outlet body 310. An outlet 313 is defined between the outlet body 310 and the outlet cover 302. The outlet body 310 also includes a stem portion 312 that extends from the outlet body 310. A retainer 314 is placed at a distal end of the stem 312, and the retainer 314 is used to retain or maintain the outlet cover 302 in reciprocating arrangement with the outlet body 310. A brake mechanism is used to cause the outlet cover 302 to brake or decelerate in its translation relative to the outlet body 310 responsive to the outlet body 310 being made to decelerate (the outlet body 310 is made to decelerate because the screw 306 is being made to decelerate along a length of the barrel 308). By being made to brake, the outlet cover 302 is substantially maintained in a cooperative sealing arrangement relative to the outlet body 310 so that the outlet 313 may remain covered and substantially sealed as the outlet body 310 is made to decelerate. When the outlet 313 remains sealed, there is a reduced chance of experiencing backflow of melt.

It is not a requirement to maintain the outlet 313 sealed constantly during deceleration of the outlet body 310, but the outlet 313 is allowed to open so as to permit release of a predetermined amount (preferably a small amount) of backflow of melt for each injection cycle. Under this arrangement, a shot size injected into a mold cavity is calculated as an amount of shot accumulated before an injection cycle minus the predetermined amount of backflow during the injection cycle.

When the screw 306 is required to decelerate in accordance with a molding machine cycle, the screw 306 decelerates the outlet body 310, and the outlet cover 302 responsively brakes so as to maintain sealing engagement with the outlet body 310. The outlet cover 302 substantially maintains its braking (decelerating) characteristics to that of the outlet body 310 in response to the outlet body 310 being made to decelerate. In effect, the outlet body 310 and the outlet cover 302 decelerate at a substantially same or near same rate of deceleration relative to each other. For the embodiment depicted in FIG. 2A, while friction may be detrimental to the useful life of the valve 304 (and/or the barrel 308), friction is used to decelerate the cover 302 so that the cover 302 substantially seals against the outlet body 310 while the valve 304 is made to decelerate.

Figure 2B:
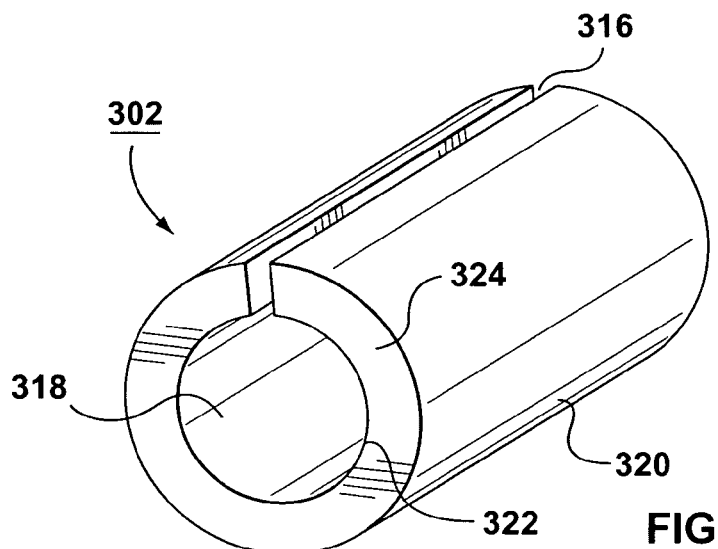

FIG. 2B is a perspective view of the valve 304 of FIG. 2A. The outlet cover 302 is a hollow cylinder but other shapes may be used. The outlet cover 302 defines a slot 316 that extends therein at least in part or completely. The slot 316 permits the outlet cover 302 to sufficiently flex against, and substantially frictionally engage with, an inside surface of the barrel 308 responsive to the screw 306 operating to pressurize the melt disposed in a passageway defined between the outlet cover 302 and the stem portion 312. By way of example, the material for the flexible cover 302 is specified in DIN 1.2888, which calls for a material that holds tip under chemical and high temperature demands.

In a variation (not depicted), the outlet cover 302 forms a cylinder that presents a top end, a bottom end and an outer-facing surface 320, and defines the passageway 318 therethrough that extends from the top end to the bottom end. The cylinder presents an inner-facing surface 322 that faces a melt passageway 318. The outlet cover 302 defines a cut (a slot) that extends from the outer-facing surface 320 to the inner-facing surface 322. In another variation (not depicted), the outlet cover 302 defines a cut (a slot) that extends from the top end to the bottom end of the cylinder. In yet another variation (not depicted), the outlet cover 302 includes at least one cut (slot) that extends between the inner circumferential surface 322 and the outer circumferential surface 320 and between a leading end face 324 (top surface) and a trailing end face (the bottom end). It will be appreciated that may variations can be made to the outlet cover 302.

There is an amount of shot accumulated within the barrel 308 (between the outlet body 310 and the opening that leads into a mold cavity). The technical effect of the brake is that brake permits the amount of accumulated shot size injected (for each injection cycle) into the mold cavity to be more repeatable, and thus the valve 304 has a higher repeatability. Also, another technical effect is that the brake permits the valve to apply more consistent injection pressure that, in turn, permits the molding of parts having improved and consistent attributes.

Figure 2C:
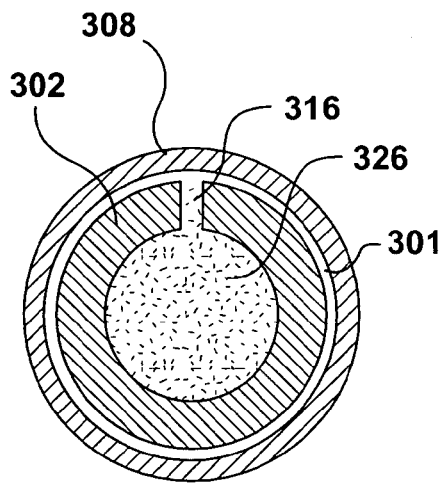
Figure 2D:
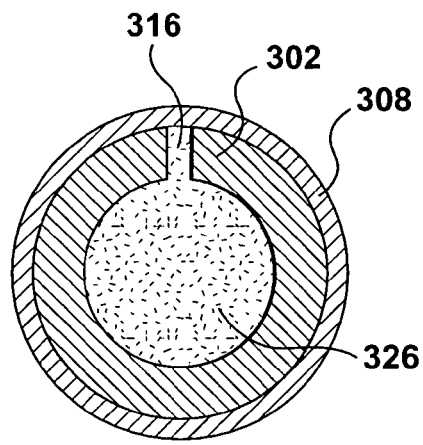

FIGS. 2C and 2D are cross sectional views of the valve 304 of FIG. 2A along line C-C. In FIG. 2C, the screw 306 of FIG. 2A does not pressurize the melt 326, and so the un-pressurized melt 326 does not force the cover 302 to flex against and contact with an inside surface of the barrel 308. A gap 301 is shown between the cover 302 and the inside surface of the barrel 308 to emphasize that the cover 302 does not substantially flex against the inside surface of the barrel 308. The slot 316 makes the outlet cover 302 appear to be C-shaped in an end view. The gap 301 becomes evident when the cover is subjected to injection pressure causing the gap to widen. When un-pressurized, the gap 301 could disappear entirely as both faces of the slot 301 could touch. In FIG. 2D, the screw 306 operates to pressurize the melt 326, and in response the slot 316 permits the outlet cover 302 to sufficiently flex against and substantially frictionally engage with the inside surface of the barrel 308 so that when the outlet body 310 is made to decelerate, the outlet cover 302 also decelerates so as to remain in a sealing and contact arrangement with the body 310 so as to keep the outlet 313 covered to prevent backflow of melt. In this way, inadvertent leaks between the outlet body 310 and the outlet cover 302 are avoided or substantially reduced during moments of the molding machine cycle that require the outlet body 310 to decelerate. As a result of the outlet cover 302 braking and maintaining sealing arrangement, the melt pressure (within the accumulated shot) maintains a relatively constant level so that the article being molded in the mold cavity is packed sufficiently enough so that the finished molded article is more likely to achieve its target weight and density (physical attributes).

Alternatively, a wedge (not depicted) is inserted into the slot 316 so that the melt 326 is substantially prevented from reaching the inner surface of the barrel 308 or from leaking past the outlet cover 302. Alternatively, the retainer 314 is detachable from the stem 312 so as to facilitate removal of the outlet cover 302 from the valve 304.

The slot 316 can be formed, for example, by electrical discharge machining (EDM) using a fine wire having a diameter of 0.5 mm or less, but preferably 0.25 mm or less. It will be understood that other wire diameters may be employed although it is preferred for the cut to have a width that is as narrow as possible. Any tool that is equivalent to the EDM approach can also produce the slot 316 with narrow controllable widths so as to provide substantially facing mating surfaces on opposite sides of the clot 316.

The slot 316 can be formed into any sort of geometry, such as for example: the slot 316 is forms a straight-line configuration, the slot has straight segments which meet at right angles to form overlapping portions in the cover 302, and the slot is sinusoidal shaped to form overlapping portions in the cover 302.

Figure 3A:
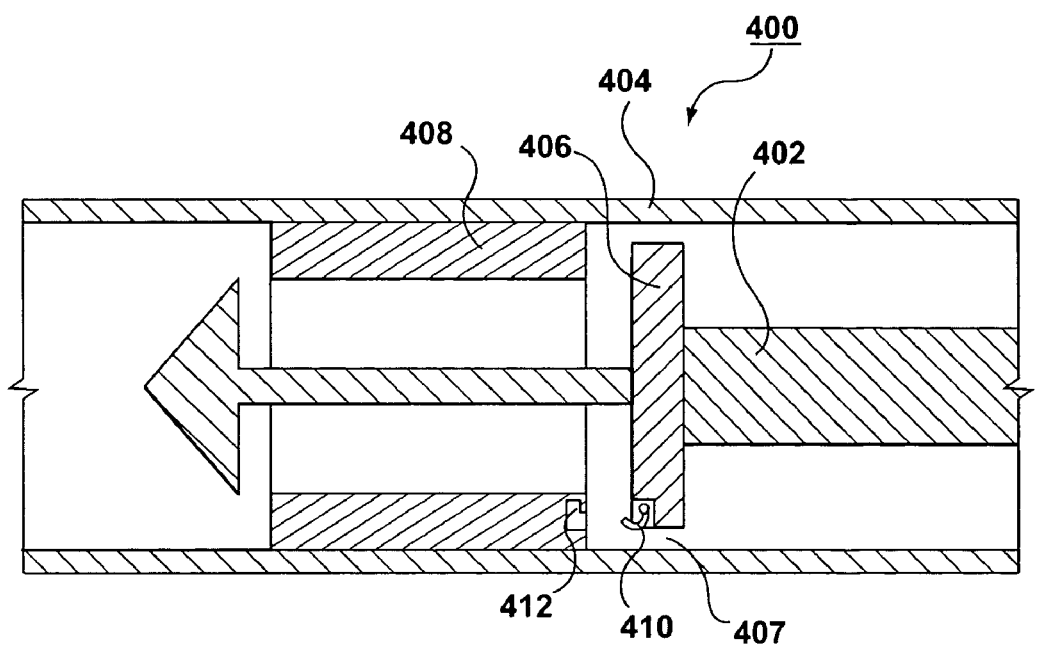
FIGS. 3A and 3B show a non-return valve according to a second embodiment.
Figure 3B:
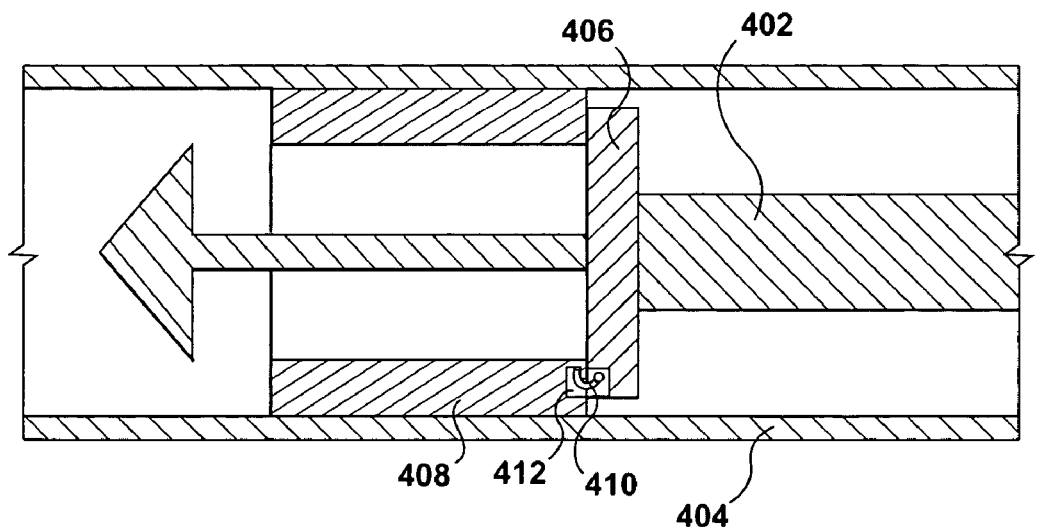

FIGS. 3A and 3B are cross sectional views of a non-return valve 400 according to the second embodiment. The valve 400 is attachable to a screw 402 fitted within a barrel 404 of a molding machine (not depicted). The valve 400 includes an outlet cover 408 and an outlet cover 408. The body 406 and the cover 408 define an outlet 407 therebetween. The valve 400 also includes a brake that functions in a manner similar to that used with the valve 304 of FIG. 2A in that the brake substantially maintains the outlet cover 408 and the outlet body 406 substantially cooperatively sealing with each other as the outlet body 406 decelerates, and substantially keeps the outlet cover 408 keeps outlet 407 covered so as to prevent backflow of melt.

The brake according to the second embodiment includes a latch mechanism 410 that selectively actuatably latches the outlet cover 408 to the outlet body 406 responsive to receiving a signal to actuate. For example, the latch mechanism 410 includes a solenoid that activates a latching arm responsive to receiving a latching signal. A recess 412 is defined by the body 406 so that the latch mechanism 410 latchably interacts with the recess 412. In FIG. 3A, the latch mechanism 410 is actuated so that the outlet body 406 and the outlet cover 408 remain unlatched or detached from one another during selected molding machine cycles. However, when a predetermined molding machine cycle requires the valve 400 to be decelerated, the latch mechanism 410 is actuated to latch the outlet body 406 with the outlet cover 408 so that the outlet cover 408 remains in a sealing arrangement with the outlet body 406 as the outlet body 406 is made to decelerate.

Figure 4A:
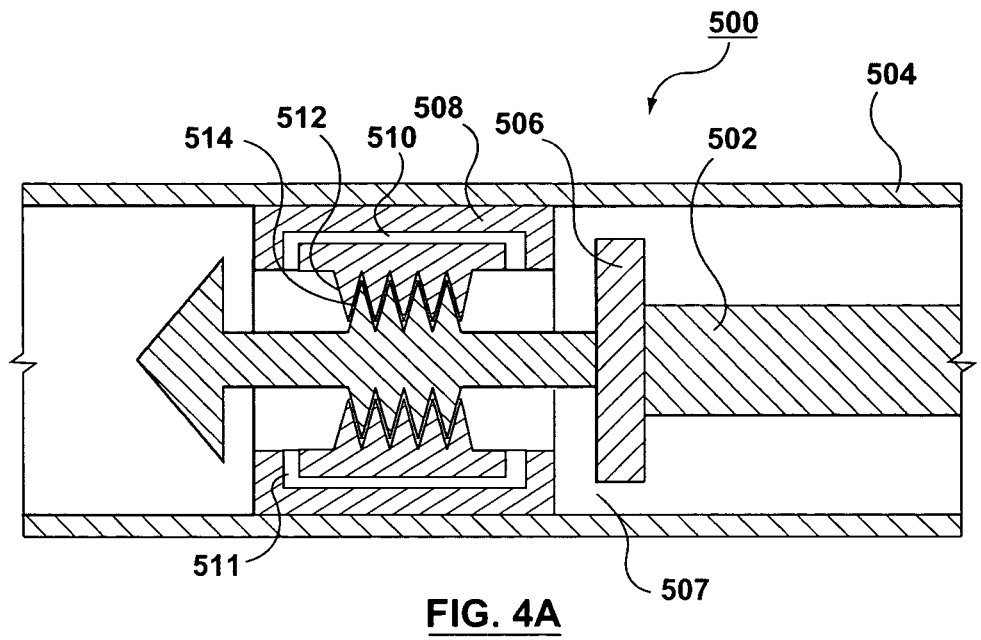
FIGS. 4A and 4B show a non-return valve according to a third embodiment.
Figure 4B:
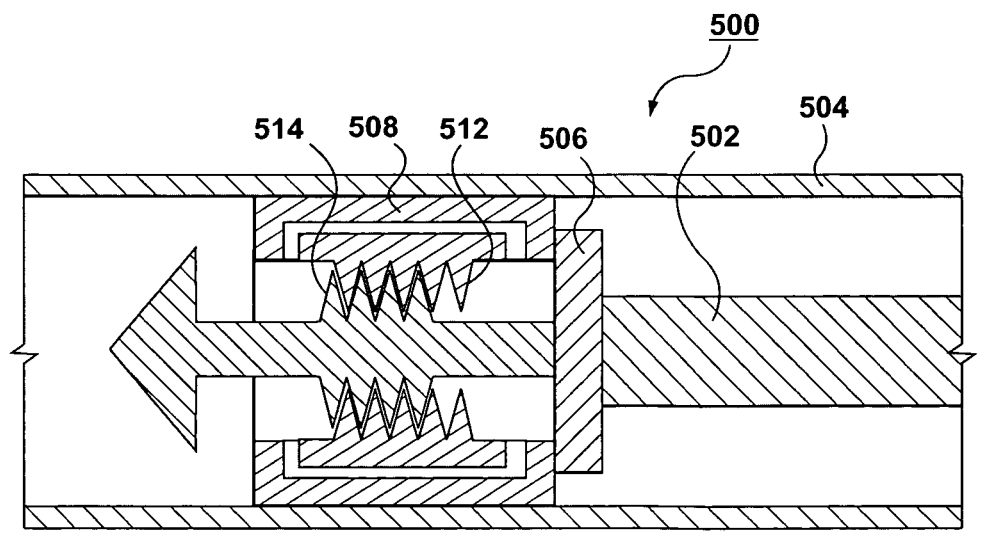

FIGS. 4A and 4B are cross sectional views of a non-return valve 500 according to the third embodiment. The valve 500 is attachable to a screw 502 fitted within a barrel 504 of a molding machine (not depicted). The valve 500 includes an outlet body 506 and an outlet cover 508 (and the body 506 and the cover 508 define an outlet 507 therebetween). The valve 500 also includes a brake that functions similarly to that of the valve 304 of FIG. 2A in that the brake substantially maintains the outlet cover 508 and the outlet body 506 substantially cooperatively sealing with each other (and keeps the outlet 507 covered) as the outlet body 506 is made to decelerate.

Specifically, the brake, according to the third embodiment, includes interactable threads 512 and 514 disposed on the outlet cover 508 and a stem that extends from the outlet body 506 respectively. The brake, in effect, interactively engages the outlet cover 508 with the outlet body 506 responsive to the screw 502 being made to rotate the outlet body 506 before the screw 502 is made to translate. The cover 508 frictionally engages the inner surface of the barrel 504 sufficiently enough so that when the screw 502 is rotated, the threads may interact with each other but not sufficiently enough to hamper translation of the screw 502 and cause too much wear on the barrel surface. It will be appreciated that some frictional wearing of the barrel will occur with this embodiment and therefore this embodiment may not be as desirable as other embodiments. The screw 502 rotates in one direction to process the melt, and then rotates in another direction to cause the threads 512 and 514 to engage, rotate relative to one another, and then seal the body 506 with the cover 508 so that the outlet becomes covered. The cover 508 defines a channel 510 therein. When the threads 512 and 514 engage with each other, the channel 510 permits passage of the melt from the back end to the forward end of the valve 500. There may be several channels or one channel defined by the cover 508.

In an alternative arrangement of the third embodiment, a shaft (not depicted) is disposed coaxially within and along the screw 502, and the shaft extends through the outlet body 506 (but does not attach with the body 506). The shaft is attached to the outlet cover 508. Upon rotation of the shaft, the threads 512 and 514 engage with each other.

Figure 5A:
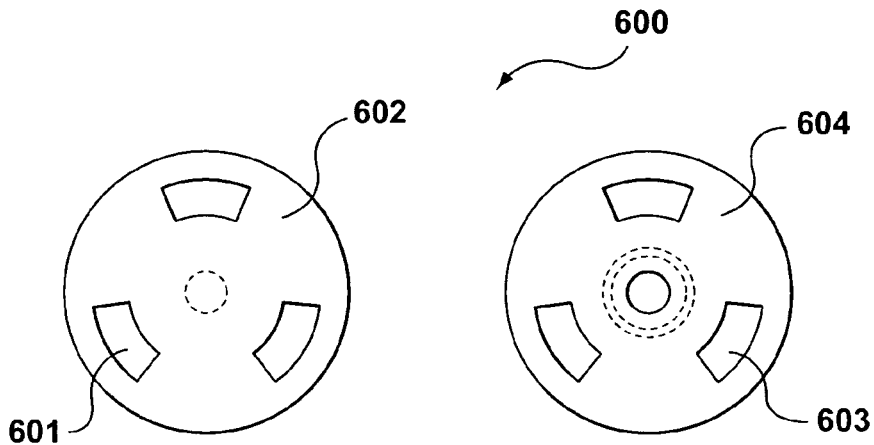
FIGS. 5A, 5B and 5C show a non-return valve according to a fourth embodiment.

FIG. 5A is a front view of a non-return valve 600 according to the fourth embodiment. The valve 600 includes an outlet body 604 and an outlet cover 602. The outlet body 604 is a disk that forms one or more passageways 603 therein that permit passage of melt therethrough. The outlet cover 602 is another disk that forms one or more passageways 601 therein that permit passage of melt therethough.

The valve 600 also includes a brake that functions in similar way to that of the valve 304 of FIG. 2A in that the brake substantially maintains the outlet cover 602 and the outlet body 604 substantially cooperatively sealing with each other as the outlet body 604 is made to decelerate.

Figure 5B:
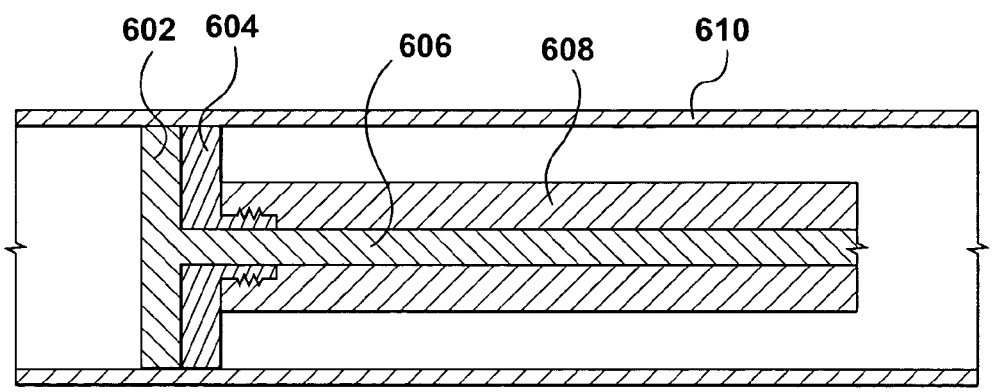
Figure 5C:
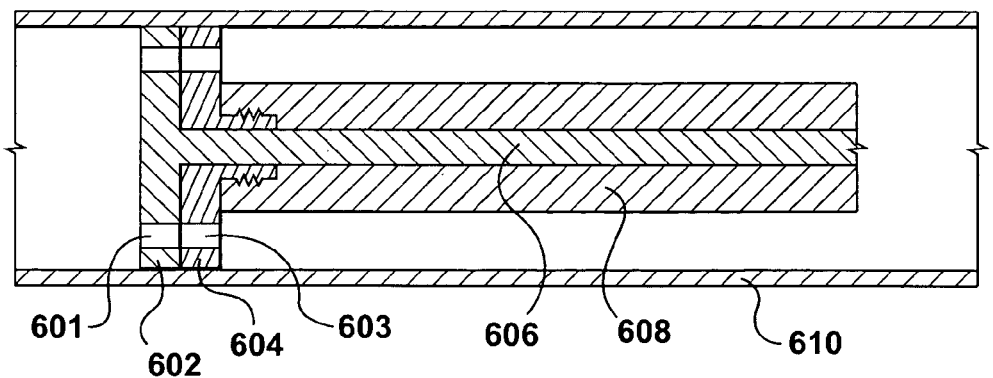

FIGS. 5B and 5C are cross sectional views of the valve 600 of FIG. 5A. Specifically, the brake according to the fourth embodiment is a rotatable shaft 606 connected to the outlet cover 602. The shaft 606 is coaxially aligned with a screw 608 mounted within a barrel 610 of a molding machine (not depicted). The shaft 606 is selectively rotated so as to permit selective alignment of one or more passageways of the body 602 with the one or more passageways of the outlet body 604. In FIG. 5B, the shaft 606 is rotated so that the passageways of the body 602 do not align with the passageways of the outlet body 604, so that when the outlet body 604 is decelerated and the outlet cover 602 responds by decelerating along with the outlet body 604 while it remains substantially engaged therewith when so required by the molding machine cycle. In FIG. 5C the shaft 606 is rotated so that the passageways become aligned to permit passage of melt through the passageways defined by the outlet cover 602 and the outlet body 604. In the depicted position, the screw 608 does not accelerate or decelerate the valve 600, but rather rotates to push the melt and build up a shot of melt. A mechanism (not depicted) is used to translate the screw 608 and to translate the shaft 606. The mechanism holds the screw 608 and the shaft 606 fixed relative to each other so that there is no relative movement between the screw 608 and the shaft 606, and the mechanism is activated to cause the screw 608 and the shaft 606 to decelerate simultaneously relative to each other. In effect, the shaft 606 acts to brake the cover 602 relative to the body 604.

Figure 6A:
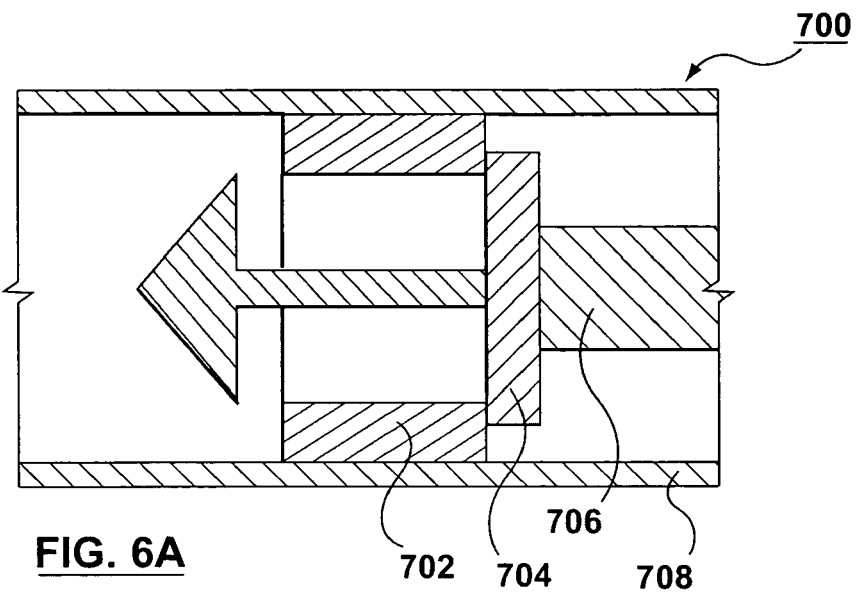
FIGS. 6A, 6B and 6C show a non-return valve according to a fifth embodiment.

FIG. 6A is a cross sectional view of a non-return valve 700 according to the fifth embodiment. The valve 700 includes an outlet body 704 and an outlet cover 702. The outlet body 704 is attached to a screw 706 mounted within a barrel 708 of a molding machine (not depicted). The valve 700 also includes a brake that functions in a manner that is similar that of the valve 304 of FIG. 2A in that the brake substantially maintains the outlet cover 702 and the outlet body 704 substantially cooperatively sealing with each other as the outlet body 704 is made to decelerate.

Figure 6B:
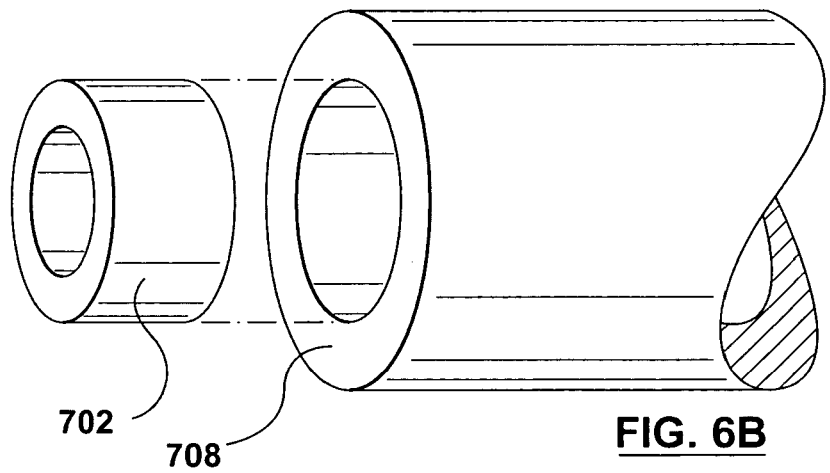
Figure 6C:
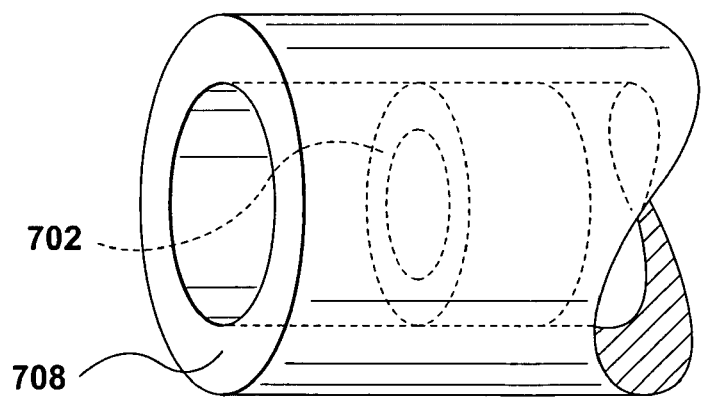

FIGS. 6B and 6C are perspective views of the valve 700 of FIG. 6A. Specifically, the brake according to the fifth embodiment, is realized by configuring the barrel 708 to have a first rate of expansion and configuring the outlet cover 702 to have a second rate of expansion. The second rate of expansion of the cover 702 is greater than the first rate of expansion of the barrel 708 so that, in response to exposing the barrel 708 and the cover 702 to a barrel operating temperature range; the outlet cover 702 expands to frictionally engage the barrel 708 so that when the outlet body 704 decelerates, the difference in rates of expansion is sufficient enough to enable the outlet cover 702 to brake and substantially maintain sealing with the outlet body 704. FIG. 6B shows that at room temperature, the rates of expansion are such that the outlet cover 702 is easily fitted or slidable within the barrel 708. FIG. 6C shows that at the barrel operating temperature range, the cover 702 expands against the barrel 708 and brakes accordingly. It will be appreciated that some frictional wearing of the barrel will occur with this embodiment and therefore this embodiment may not be as desirable as other embodiments.

Figure 7A:
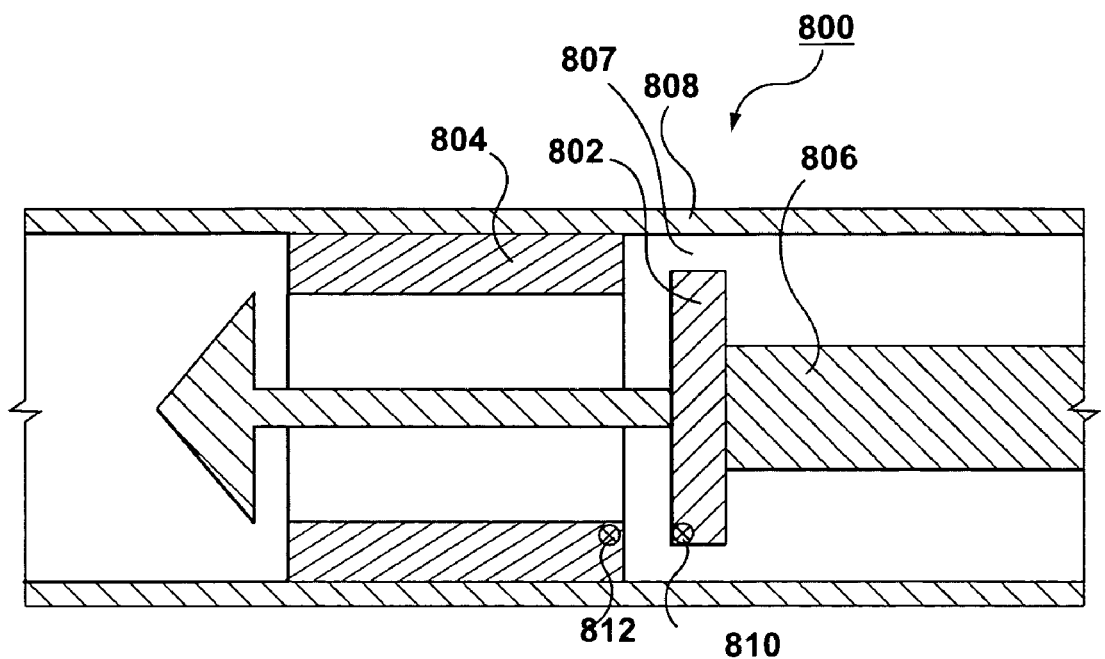
FIGS. 7A and 7B show a non-return valve according to a sixth embodiment.
Figure 7B:
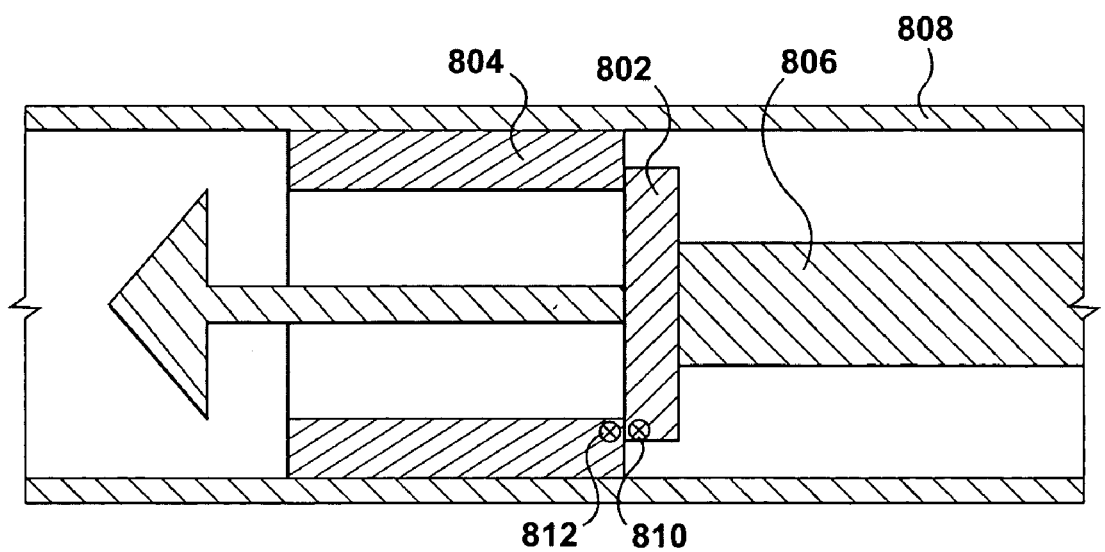

FIGS. 7A and 7B are cross sectional views of a non-return valve 800 according to the sixth embodiment. The valve 800 includes an outlet body 802 and an outlet cover 804. The outlet body 802 is attached to a screw 806 mounted within a barrel 808 of a molding machine (not depicted). The valve 800 also includes a brake that functions in a manner similar to that of the valve 304 of FIG. 2A in that the brake substantially maintains the outlet cover 804 and the outlet body 802 substantially cooperatively sealing with each other as the outlet body 802 decelerates so that the outlet 807 remains covered.

Specifically, the brake according to the sixth embodiment is a magnetic mechanism that selectively attracts and seals the cover 804 with the outlet body 802 responsive to receiving a signal to attract. A permanent magnet 812 is installed in the cover 804, and has a predetermined polarity facing the outlet body 802. An electromagnet 810 is installed in the outlet body 802 and is selectively powered on and off via control and power wiring (not depicted) threaded within the screw 806. A controller (not depicted) is attached to the control and power wiring, and transmits an actuation signal to selectively energize the electromagnet 810 so that the electromagnet 810 is either attracted towards or repelled away from the permanent magnet 812. Alternatively, power may be induced into the electromagnet 812 by way of a transformer (not depicted) coupled to the barrel 808, and the control signal is used to energize and de-energize the transformer thus powering on and off the electromagnet 810.

The brake mentioned in the foregoing embodiments can be supplied or sold separately from a non-return valve (as a replacement part to be integrated with the valve by the end user). Alternatively, the brake mentioned in the foregoing embodiments can be included in a non-return valve and the combination is sold as a complete kit. A molding machine may be sold with the non-return valves as described in the foregoing embodiments or may be sold separately from the valves.

Preferably, a molding machine that is uses the embodiments described above is a thixo molding machine, and the valves according to the embodiments described above are used for metering and handling a metallic slurry molding material, such as a magnesium alloy.

It will be appreciated that some elements may be adapted for specific conditions or functions. The concepts described above may be further extended to a variety of other applications that are clearly within the scope of the present invention. Having thus described the embodiments, it will be apparent to those skilled in the art that modifications and enhancements are possible without departing from the concepts as described. Therefore, what is intended to be protected by way of Letters Patent should be limited only by the scope of the following claims.

The invention claimed is:

1. A device configured for a valve having a valve structure, the valve structure configured to include an outlet body configured to define an outlet, the outlet body also configured to attach to a melt processing screw of a molding machine, the valve structure also configured to include an outlet cover configured to selectively close and open the outlet, the device comprising:
a brake configured to decelerate the outlet cover responsive to deceleration of the outlet body, the decelerating outlet cover maintaining the outlet substantially closed during deceleration of the melt processing screw.

2. The device of claim 1, wherein:
the molding machine includes:
a barrel, and
the melt processing screw configured to operate within the barrel; and
the outlet body is configured to detachably attach relative to the melt processing screw.

3. The device of claim 2, wherein:
the outlet cover defines a slot extending into the outlet cover at least in part; and
the brake includes the slot configured to permit the outlet cover to sufficiently flex against and substantially frictionally engage with the barrel responsive to the melt processing screw operating to pressurize melt disposed adjacent to the outlet cover.

4. The device of claim 3, further comprising:
a wedge configured to fit within the slot.

5. The device of claim 2, wherein:
the outlet cover:
forms a cylinder presenting a top end, a bottom end and an outer facing surface,
defines a melt passageway therethrough extending from the top end to the bottom end,
presents an inner facing surface facing the melt passageway, and
defines a slot extending from the outer facing surface to the inner
facing surface; and
the brake includes the slot configured to permit the outlet cover to sufficiently flex against and substantially frictionally engage with the barrel responsive to the melt processing screw operating to pressurize melt disposed adjacent to the outlet cover.

6. The device of claim 2, wherein:
the outlet cover:
forms a cylinder presenting a top end, a bottom end and an outer facing surface,
defines a melt passageway therethrough extending from the top end to the bottom end,
presents an inner surface facing the melt passageway, and
defines a slot extending from the top end to the bottom end; and
the brake includes the slot configured to permit the outlet cover to sufficiently expand against and substantially frictionally engage the barrel responsive to the melt processing screw operating to pressurize melt disposed adjacent to the outlet cover.

7. The device of claim 2, wherein:
the outlet cover includes at least one slot extending between inner and outer circumferential surfaces of the outlet cover and extending between leading and trailing end faces of the outlet cover; and
the brake includes a slot configured to permit the outlet cover to sufficiently expand against and substantially frictionally engage the barrel responsive to the melt processing screw operating to pressurize melt disposed adjacent to the outlet cover.

8. The device of claim 2, wherein:
the brake includes:
a latch configured to selectively actuatably latch the outlet cover with the outlet body, and configured to substantially maintain sealing engagement between the outlet and the outlet cover as the outlet body decelerates.

9. The device of claim 2, wherein:
the brake includes:
interactable threads being disposed on the outlet cover and the outlet body, and being configured to interactively engage the outlet cover with the outlet body responsive to the melt processing screw operating to rotate.

10. The device of claim 2, wherein:
the outlet body is a first disk forming a first passageway therein, and is connected to the melt processing screw;

the outlet cover is a second disk forming a second passageway therein, and is placed adjacently to the first disk; and the brake includes:
a rotatable shaft connected to the outlet cover, and is configured to selectively align the first passageway with the second passageway responsive to selectively rotating the rotatable shaft.

11. The device of claim 10, wherein:
the rotatable shaft is coaxially aligned with the melt processing screw.

12. The device of claim 2, wherein:
the barrel has a first rate of expansion;
the outlet cover has a second rate of expansion; and
the brake includes the second rate of expansion being greater than the first rate of expansion, and responsive to a barrel operating temperature range the outlet cover expands to sufficiently frictionally engage the barrel and to sufficiently decelerate the outlet body and substantially maintain sealing engagement between the outlet cover and the outlet.

13. The device of claim 2, wherein:
the brake includes the outlet cover configured to substantially frictionally contact the barrel responsive to the melt processing screw operating to pressurize melt disposed adjacent to the outlet cover.

14. The device of claim 2, wherein:
the brake includes:
magnetic means selectively attracting and sealing the outlet cover with the outlet responsive to deceleration of the outlet body.

15. The device of claim 2, further comprising:
a stem extending from the outlet body; and
a retainer detachably attached to a distal end of the stem so as to facilitate removal of the outlet cover.

16. The device of claim 1, wherein:
the molding machine is a thixo molding machine.

17. The device of claim 3, wherein:
the slot has a width less than 0.5 mm.

18. The device of claim 3, wherein:
the slot has a width of less than 0.25 mm.

19. The device of claim 3, wherein:
the slot is formed by wire electric discharge machining (EDM).

20. The device of claim 3, wherein:
the slot is formed into a straight-line configuration.

21. The device of claim 3, wherein:
the slot has straight segments which meet at right angles to form overlapping portions in the cover.

22. The device of claim 3, wherein:
the slot is sinusoidally shaped to form overlapping portions in the cover.

23. A valve, comprising:
a valve structure configured to include:
an outlet body configured to define an outlet, and to attach to a melt processing screw of a molding machine, and
an outlet cover configured to selectively close and open the outlet; and
a brake configured to decelerate the outlet cover responsive to deceleration of the outlet body, the decelerating outlet cover maintaining the outlet substantially closed during deceleration of the melt processing screw.

24. The valve of claim 23, wherein:
the molding machine includes:
a barrel, and
the melt processing screw configured to operate within the barrel; and
the outlet body is configured to detachably attach relative to the melt processing screw.

25. The valve of claim 24, wherein:
the outlet cover defines a slot extending into the outlet cover at least in part; and
the brake includes the slot configured to permit the outlet cover to sufficiently flex against and substantially frictionally engage with the barrel responsive to the melt processing screw operating to pressurize melt disposed adjacent to the outlet cover.

26. The valve of claim 25, further comprising:
a wedge configured to fit within the slot.

27. The valve of claim 24, wherein:
the outlet cover:
forms a cylinder presenting a top end, a bottom end and an outer facing surface,
defines a melt passageway therethrough extending from the top end to the bottom end,
presents an inner facing surface facing the melt passageway, and
defines a slot extending from the outer facing surface to the inner facing surface; and
the brake includes the slot configured to permit the outlet cover to sufficiently flex against and substantially frictionally engage with the barrel responsive to the melt processing screw operating to pressurize melt disposed adjacent to the outlet cover.

28. The valve of claim 24, wherein:
the outlet cover:
forms a cylinder presenting a top end, a bottom end and an outer facing surface,
defines a melt passageway therethrough extending from the top end to the bottom end,
presents an inner surface facing the melt passageway, and
defines a slot extending from the top end to the bottom end; and
the brake includes the slot configured to permit the outlet cover to sufficiently expand against and substantially frictionally engage the barrel responsive to the melt processing screw operating to pressurize melt disposed adjacent to the outlet cover.

29. The valve of claim 24, wherein:
the outlet cover includes at least one slot extending between inner and outer circumferential surfaces of the outlet cover and extending between leading and trailing end faces of the outlet cover; and
the brake includes a slot configured to permit the outlet cover to sufficiently expand against and substantially frictionally engage the barrel responsive to the melt processing screw operating to pressurize melt disposed adjacent to the outlet cover.

30. The valve of claim 24, wherein:
the brake includes:
a latch configured to selectively actuatably latch the outlet cover with the outlet body, and configured to substantially maintain sealing engagement between the outlet and the outlet cover as the outlet body decelerates.

31. The valve of claim 24, wherein:
the brake includes:
interactable threads being disposed on the outlet cover and the outlet body, and being configured to interactively engage the outlet cover with the outlet body responsive to the melt processing screw operating to rotate.

32. The valve of claim 24, wherein:
the outlet body is a first disk forming a first passageway therein, and is connected to the melt processing screw;
the outlet cover is a second disk forming a second passageway therein, and is placed adjacently to the first disk; and
the brake includes:
a rotatable shaft connected to the outlet cover, and is configured to selectively align the first passageway with the second passageway responsive to selectively rotating the rotatable shaft.

33. The valve of claim 32, wherein:
the rotatable shaft is coaxially aligned with the melt processing screw.

34. The valve of claim 24, wherein:
the barrel has a first rate of expansion;
the outlet cover has a second rate of expansion; and
the brake includes the second rate of expansion being greater than the first rate of expansion, and responsive to a barrel operating temperature range the outlet cover expands to sufficiently frictionally engage the barrel and to sufficiently decelerate the outlet body and substantially maintain sealing engagement between the outlet cover and the outlet.

35. The valve of claim 24, wherein:
the brake includes the outlet cover configured to substantially frictionally contact the barrel responsive to the melt processing screw operating to pressurize melt disposed adjacent to the outlet cover.

36. The valve of claim 24, wherein:
the brake includes:
magnetic means selectively attracting and sealing the outlet cover with the outlet responsive to deceleration of the outlet body.

37. The valve of claim 24, further comprising:
a stem extending from the outlet body; and
a retainer detachably attached to a distal end of the stem so as to facilitate removal of the outlet cover.

38. The valve of claim 23, wherein:
the molding machine is a thixo molding machine.

39. The valve of claim 25 wherein:
the slot has a width less than 0.5 mm.

40. The valve of claim 25, wherein:
the slot has a width of less than 0.25 mm.

41. The valve of claim 25, wherein:
the slot is formed by wire electric discharge machining (EDM).

42. The valve of claim 25, wherein:
the slot is formed into a straight-line configuration.

43. The valve of claim 25, wherein:
the slot has straight segments which meet at right angles to form overlapping portions in the outlet cover.

44. The valve of claim 25, wherein:
the slot is sinusoidally shaped to form overlapping portions in the outlet cover.

45. A molding machine, comprising:
a melt processing screw; and
a valve, including:
a valve structure configured to include:
an outlet body configured to define an outlet, and to attach to the melt processing screw, and
an outlet cover configured to selectively close and open the outlet; and
a brake configured to decelerate the outlet cover responsive to deceleration of the outlet body, the decelerating outlet cover maintaining the outlet substantially closed during deceleration of the melt processing screw.

46. The molding machine of claim 45, wherein:
the molding machine includes a barrel; and
the melt processing screw is configured to operate within the barrel; and
the outlet body is configured to detachably attach relative to the melt processing screw.

47. The molding machine of claim 46, wherein:
the outlet cover defines a slot extending into the outlet cover at least in part; and
the brake includes the slot configured to permit the outlet cover to sufficiently flex against and substantially frictionally engage with the barrel responsive to the melt processing screw operating to pressurize melt disposed adjacent to the outlet cover.

48. The molding machine of claim 47, further comprising:
a wedge configured to fit within the slot.

49. The molding machine of claim 46, wherein:
the outlet cover:
forms a cylinder presenting a top end, a bottom end and an outer facing surface,
defines a melt passageway therethrough extending from the top end to the bottom end,
presents an inner facing surface facing the melt passageway, and
defines a slot extending from the outer facing surface to the inner facing surface; and
the brake includes the slot configured to permit the outlet cover to sufficiently flex against and substantially frictionally engage with the barrel responsive to the melt processing screw operating to pressurize melt disposed adjacent to the outlet cover.

50. The molding machine of claim 46, wherein:
the outlet cover:
forms a cylinder presenting a top end, a bottom end and an outer facing surface,
defines a melt passageway therethrough extending from the top end to the bottom end,
presents an inner surface facing the melt passageway, and
defines a slot extending from the top end to the bottom end; and
the brake includes the slot configured to permit the outlet cover to sufficiently expand against and substantially frictionally engage the barrel responsive to the melt processing screw operating to pressurize melt disposed adjacent to the outlet cover.

51. The molding machine of claim 46, wherein:
the outlet cover includes at least one slot extending between inner and outer circumferential surfaces of the outlet cover and extending between leading and trailing end faces of the outlet cover; and
the brake includes a slot configured to permit the outlet cover to sufficiently expand against and substantially frictionally engage the barrel responsive to the melt processing screw operating to pressurize melt disposed adjacent to the outlet cover.

52. The molding machine of claim 46, wherein:
the brake includes:
- a latch configured to selectively actuatably latch the outlet cover with the outlet body, and configured to substantially maintain sealing engagement between the outlet and the outlet cover as the outlet body decelerates.

53. The molding machine of claim 46, wherein:
the brake includes:
- interactable threads being disposed on the outlet cover and the outlet body, and being configured to interactively engage the outlet cover with the outlet body responsive to the melt processing screw operating to rotate.

54. The molding machine of claim 46, wherein:
the outlet body is a first disk forming a first passageway therein, and is connected to the melt processing screw;
the outlet cover is a second disk forming a second passageway therein, and is placed adjacently to the first disk; and
the brake includes:
- a rotatable shaft connected to the outlet cover, and is configured to selectively align the first passageway with the second passageway responsive to selectively rotating the rotatable shaft.

55. The molding machine of claim 54, wherein:
the rotatable shaft is coaxially aligned with the melt processing screw.

56. The molding machine of claim 46, wherein:
the barrel has a first rate of expansion;
the outlet cover has a second rate of expansion; and
the brake includes the second rate of expansion being greater than the first rate of expansion, and responsive to a barrel operating temperature range the outlet cover expands to sufficiently frictionally engage the barrel and to sufficiently decelerate the outlet body and substantially maintain sealing engagement between the outlet cover and the outlet.

57. The molding machine of claim 46, wherein:
the brake includes the outlet cover configured to substantially frictionally contact the barrel responsive to the melt processing screw operating to pressurize melt disposed adjacent to the outlet cover.

58. The molding machine of claim 46, wherein:
the brake includes:
- magnetic means selectively attracting and sealing the outlet cover with the outlet responsive to deceleration of the outlet body.

59. The molding machine of claim 46, further comprising:
a stem extending from the outlet body; and
a retainer detachably attached to a distal end of the stem so as to facilitate removal of the outlet cover.

60. The molding machine of claim 45, wherein:
the molding machine is a thixo molding machine.

61. The molding machine of claim 47, wherein:
the slot has a width less than 0.5 mm.

62. The molding machine of claim 47, wherein:
the slot has a width of less than 0.25 mm.

63. The molding machine of claim 47, wherein:
the slot is formed by wire electric discharge machining (EDM).

64. The molding machine of claim 47, wherein:
the slot is formed into a straight-line configuration.

65. The molding machine of claim 47, wherein:
the slot has straight segments which meet at right angles to form overlapping portions in the outlet cover.

66. The molding machine of claim 47, wherein:
the slot is sinusoidally shaped to form overlapping portions in the outlet cover.

* * * * *